3,215,550
METHYLENE MALONONITRILES CONTAINING ARYL AND HETEROCYCLIC SUBSTITUENTS AS UV LIGHT ABSORBERS IN ORGANIC MATERIALS
Albert F. Strobel, Delmar, and Sigmund C. Catino, Castleton, N.Y., assignors to General Aniline & Film Corporation, New York, N.Y., a corporation of Delaware
No Drawing. Filed Dec. 6, 1962, Ser. No. 242,642
19 Claims. (Cl. 106—176)

This invention relates to new and useful compositions which are characterized as having superior resistance to degradation and deterioration when exposed to actinic radiation and in particular to organic compositions which are protected against deterioration when exposed to such radiations by the incorporation therewith of hetero malononitrile derivatives. This invention further relates to processes for preventing the deterioration and degeneration of organic materials when exposed to actinic radiations, and in particular to ultra-violet radiations. This invention still further relates to processes for the stabilization against deterioration by ultra-violet light of organic materials by the use of hetero malononitrile derivatives.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are, of course, well known. Other effects, however, of great commercial importance relate to the photochemical degradation caused by ultra-violet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency program may not be paramount.

We have discovered that by combining hetero malononitrile derivatives with organic materials, there results compatible combinations with a vast number of film forming plastics, resins, gums, waxes and the like, which combinations further exhibit outstanding ultra-violet absorbing properties within the generally encountered ultra-violet region of 250 to 400 millimicrons. The compounds which are employed in the compositions and processes of this invention, even though they exhibit outstanding absorbing properties close to the visible region of the electromagnetic field, nevertheless are essentially colorless compounds and can be employed with the assurance that they will not contribute to color in normally colorless formulations, nor will they affect the color of a colored formulation such as a paint film or a dyed textile. Many of the compounds employed in the compositions and processes of this invention also absorb some visible light on the violet end of the spectrum which renders them particularly useful in many formulations which are susceptible to visible light degradation. Thus polyesters and polyethylene are known to be so characterized, and the stabilization of these materials is extremely successful when using the compounds herein contemplated.

The compounds of this invention, additionally, are outstanding in that they do not require a phenolic hydroxyl group in order to achieve light stability. The heretofore used hydroxybenzophenone absorbers must have such a grouping. The presence of an hydroxyl which is capable of salt formation renders these absorbers unsuitable for use in alkaline media and particularly in alkaline plastic materials such as epoxys, melamines and the like. While the compounds employed in the compositions of the present invention do not require an hydroxyl group, the presence thereof is not a disadvantage, or detriment where alkaline sensitivity is no problem.

It is, therefore, an object of the present invention to provide new and useful compositions characterized by improved resistance to degradation and deterioration by ultra-violet radiation.

It is still another object of this invention to provide compositions containing hetero malononitrile derivatives which are resistant to ultra-violet deterioration.

It is a still further object of this invention to provide processes for improving the resistance of organic materials to deterioration and degradation by actinic radiation and especially ultra-violet radiation.

It is a still further object of this invention to provide compositions and processes for improving the resistance of organic materials to deterioration and degradation by actinic radiations including short wave length visible radiations.

Other objects and advantages will appear hereinafter as the description proceeds.

The hetero malononitrile compounds which are employed in the compositions and processes of this invention have the following general formula:

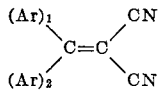

wherein $(Ar)_1$ and $(Ar)_2$ are independently selected from aromatic, carbocyclic and heterocyclic nuclei devoid of nitro groups and at least one of the radicals is heterocyclic. The heterocyclic nucleus is one having aromaticity, i.e., at least one pair of conjugated double bonds. Suitable $(Ar)_1$ and $(Ar)_2$ radicals include:

Aryl:
  Phenyl
  Tolyl
  Xylyl
  Cumyl
  α-Naphthyl
  β-Naphthyl
  α-Anthraquinonyl
  β-Anthraquinonyl
  γ-Anthraquinonyl Phenanthranyl
Diphenyl and the alkyl sustituted derivatives thereof.
Substituted aryls, e.g.:
   Anisole
   Penetole
   P-diethoxyphenyl
   1-methoxy phenanthryl
   α-Naphthylmethylether
   β-Naphthylmethylether
   α-Naphthylethylether
   β-Naphthylethylether
   Hydroxyethyl phenyl
   Hydroxypropyl phenyl
   Chlorophenyl
   Bromophenyl
   1,2-dichlorophenyl
   1,3-dichlorophenyl
   1,3,5-trichlorophenyl
   1,2-dibromophenyl
   α-Chlorotoyl
   m-Chlorotolyl
   m-Bromotolyl
   Bromo-o-xylyl
   α,β-Dichloro naphthyl
   4-bromoacenaphthyl
   Carboxyphenyl
   Carboxytolyls
   Carboxyxylyls
   Carbalkoxyphenyls, e.g.:
      Carbomethoxyphenyl
      Carboethoxyphenyl
   Carbalkoxytolyls, e.g.:
      Carbomethoxytolyls
   Acetophenyl
   Propiophenyl
   Butyrophenyl
   Lauroylphenyl
   Stearoylphenyl
   p-Acetotolyl
   o-Acetotolyl
   α-Benzoyl naphthyl
   β-Benzoyl naphthyl
   Acetaminophenyl
   Acet-methylamino phenyl
   o-Acetoaminotolyl
   p-Acetoaminotolyl
   α-Acetoaminonaphthyl
   β-Acetoaminonaphthyl
   Propio-aminophenyl
   Butyro-aminophenyl
   o-Propio-aminotolyl
   p-Propio-aminotolyl
   o-Butyroaminotolyl
   p-Butyroaminotolyl
   o-Lauroylaminotolyl
   p-Lauroylaminotolyl
   o-Stearoylaminotolyl
   p-Stearolylaminotolyl
   Sulfamyl phenyl
   Sulfamyl naphthyl
Heterocyclics:
   Thiophene
   Furane
   Pyrrole
   α-Pyrane
   γ-Pyrane
   Pyridine
   1,2-dehydropyridine
   Oxazole
   Thiazole
   Isoxazole
   Isothiazole
   Pyrazole
   3-isopyrazole
   Imidazole
   1,2,2-triazole
   1,2,4-triazole
   Tetrazole
   1,3,4-oxadiazole
   1,2,5-oxadiazole
   1,2,3-thiadiazole
   1,2,3-oxathiazole
   Pyridiazine
   Pyrimidine
   Pyrazine
   1,3,5-triazine
and fused ring systems of benzene with the aforementioned heterocyclics, e.g.:
   Benzothiophene
   Benzofurane
   Quinoline
   Phthalazine
   Benzimidazole
   1,2,3-benztriazole
   Benzoxazole The heterocyclic nuclei may contain intert substituents, as the aryl moiety, which do not affect the function and stability of the compounds but which may vary the ultraviolet absorption spectrum somewhat. These include:
Alkyl (1 to about 50 carbon atoms)
Alkenyl (1 to about 50 carbon atoms)
Substituted alkyl (1 to about 50 carbon atoms)
   e.g., cyano-, hydroxy-, carbalkoxy-, chloro-, fluoro,- bromo-, iodo-, alkoxy-, hydroxyalkoxy-, etc.
Halogen (F, Cl, Br, and I)
Acyl (acetyl to about 50 carbon acyls and aroyl including multicyclics such as naphthoyl, anthranoyl, etc.)
Sulfonyl (e.g., $CH_3SO_2$—; benzene $SO_2$, etc.)
Oxy (OH; $CH_3O$—, etc.)
Carboxamido $$\left( -CON\diagup\diagdown \right)$$

and the like.

Suitable ketones include:
Bis (3,5-dimethyl-4-propyl-3-pyrryl) ketone
Bis(5-bromo-4-ethyl-3-methyl-2-pyrryl) ketone
Bis(3-ethyl-5-methyl-2-pyrryl) ketone
Bis(4-ethyl-3-methyl-2-pyrryl) ketone
Bis(5-ethyl-3-methyl-2-pyrryl) ketone
Bis(5-bromo-2-thienyl) ketone
Bis(5-methyl-2-thienyl) ketone
Bis(5-chloro-2-thienyl) ketone
5-chloro-2-thienyl-5-bromo-2-thienyl ketone
(5-chloro-2-thienyl)-2-thienyl ketone
5-methyl-2-thienyl-5-bromo-2-thienyl ketone
5-methyl-2-thienyl-5-chloro-2-thienyl ketone
2,5-dimethyl-3-thienyl-5-chloro-2-thienyl ketone
5-chloro-2-thienyl-5-ethyl-2-thienyl ketone
2,5-dimethyl-3-thienyl-2-thienyl ketone
Bis(5-methyl-2-thienyl) ketone
Bis(2,5-dimethyl-3-thienyl) ketone
2-furyl-3-indolyl ketone
2-furyl-2-thienyl ketone
2-furyl ketone
3-thienyl ketone
2-furyl-2-methyl-3-indolyl ketone
2-furyl-1-methyl-3-indolyl ketone
3-indolyl-2-thienyl ketone
2-pyrryl-2-thienyl ketone
2,5-dimethyl-3-thienyl-2-thienyl ketone
2-pyridyl-4-pyridyl ketone
3-pyridyl-2-pyridyl ketone
5-chloro-2-thienyl-2-furyl ketone
5-chloro-2-thienyl-3-furyl ketone
3-indolyl-5-methyl-2-thienyl ketone
3-indolyl-2-pyridyl ketone
2-thienyl-3-thienyl ketone
2-acetamido-4-phenyl-5-thiazolyl phenyl ketone 2-benzofuryl phenyl ketone
2-benzothiazolyl phenyl ketone
5-bromo-2-thienyl phenyl ketone
6-(benzyloxy)-3-methyl-2-benzofuryl phenyl ketone
5-bromo-2-benzofuryl-p-bromophenyl ketone
5,7-dibromo-2-benzofuryl phenyl ketone
4,5-dibromo-2-thienyl phenyl ketone
4,5-diiodo-2-pyrryl phenyl ketone
4,5-diiodo-2-thienyl phenyl ketone
3,4-dimethoxyphenyl-2-furyl ketone
1,2-dimethyl-3-phenyl-3-pyrrolidyl phenyl ketone
3,5-dimethyl-4-isoxazolyl pentamethyl phenyl ketone
2,6-dimethyl-3-pyridyl phenyl ketone
4,5-dimethyl-3-pyrryl phenyl ketone
4,5-dimethyl-2-thiazolyl phenyl ketone
2,5-dimethyl-3-thienyl phenyl ketone
2,5-dimethyl-3-thienyl p-tolyl ketone
2,5-dimethyl-3-thienyl p-ethylphenyl ketone
2,3-dimethyl-1-naphthyl-2-thienyl ketone
2,5-diphenyl-3-furyl phenyl ketone
4,5-diphenyl-3-isoxazolyl phenyl ketone
1,5-diphenyl-3-pyrryl phenyl ketone
2-furyl-o-tolyl ketone
2-furyl-p-tolyl ketone
5-iodo-2-thienyl phenyl ketone
5-methyl-3-isoxazolyl phenyl ketone
2-methyl-3-indolyl phenyl ketone
2-methyl-3-indolyl p-tolyl ketone
2-methyl-1-naphthyl-2-thienyl ketone
2-methyl-5-benzoxazolyl phenyl ketone
5-methyl-2-thiazolyl phenyl ketone
5-methyl-3-phenyl-4-isoxazolyl phenyl ketone
5-methyl-1-phenyl-1,2,3-triazol-4-yl phenyl ketone
2-methyl-3-pyridyl phenyl ketone
1-naphthayl-2-pyridyl ketone
1-naphthyl-4-pyridyl ketone
1-naphthyl-3-pyridyl ketone
2-naphthyl-3-pyridyl ketone
Phenyl-5-phenyl-3-furyl ketone
Phenyl-5-Phenyl-3-isoxazolyl ketone
Phenyl-5-phenyl-3-pyrryl ketone
Phenyl-5-phenyl-2-pyrryl ketone
Phenyl-5-phenyl-2-thienyl ketone
Phenyl-4-thiazolyl ketone
Phenyl-5-thiazolyl ketone
Phenyl-2-thienyl ketone
Phenyl-3-pyrazolyl ketone
Phenyl-2-pyridyl ketone
Phenyl-4-pyridyl ketone
Phenyl-1,2,5-triphenyl-3-pyrryl ketone
Phenyl-1-phenyl-4-pyrazolyl ketone
Phenyl-6-phenyl-3-pyridyl ketone
Phenyl-2-furyl ketone
p-Methoxyphenyl-2-thienyl ketone
2-furyl-m-methoxyphenyl ketone
p-Hydroxyphenyl-5-methyl-2-thienyl ketone
2,5-dichloro-3-thienyl-phenyl ketone
2,6-dimethyl-4-pyridyl-phenyl ketone
3-allyl-4-hydroxyphenyl-5-ethyl-2-thienyl ketone
3,5-dichloro-2-hydroxyphenyl-2-furyl ketone
3,5-dichloro-4-methoxy-2-pyridyl phenyl ketone
3,5-dichloro-2-pyridyl phenyl ketone
3,5-dimethyl-4-isoxazolyl phenyl ketone
2,4-dimethyl-5-oxazolyl phenyl ketone
p-Ethylphenyl-5-ethyl-2-thienyl ketone
4-tertiarybutyl-3-chloro-2-hydroxyphenyl-2-furyl ketone
5-ethyl-2-thienyl-p-methoxyphenyl ketone
6-allyloxy-2,4-xylyl-2-furyl ketone
3'-chloro-4'-methoxy-4-biphenyl-yl-2-thienyl ketone
o-Chlorophenyl-5-chloro-2-thienyl ketone In addition to the above contemplated derivatives polyoxyalkylated derivatives thereof are within the purview of this invention. Any of the aforementioned compounds containing at least one reactive hydrogen atom may be reacted with an alkylene oxide or a compound functioning as an oxide (or mixtures thereof) such as:
Ethylene oxide
Propylene oxide
Butylene oxide
Butylene dioxide
Isobutylene oxide
Glycidol
Epichlorohydrin
Butadiene dioxide
Isobutylene oxide
Styrene oxide
and the like to yield the corresponding polyoxyalkylated products. Among the types of compounds which are reactive in this manner are:
Hydroxy compounds
Amide compounds
Carboxy compounds, etc.

From one to about 200 moles of oxyalkylating agent may be condensed with the said reactive compounds.

The general procedure for preparing the compounds of this invention involves a condensation of the ketone with (a) malononitrile or (b) with cyanoacetamide followed by dehydration to the dinitrile.

The following examples will serve to illustrate the present invention without being deemed limitative thereof. Parts are by weight unless otherwise indicated.

*Example 1*

I. Preparation of

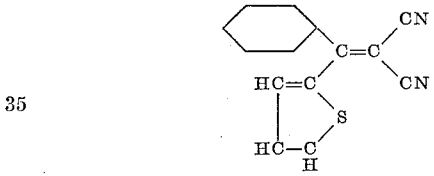

phenyl-2-thienylmethylene malononitrile.

Into a dry flask fitted with a stirrer, thermometer, reflux condenser to the top of which is attached a drying tube containing anhydrous calcium chloride, and heating mantle, there are added 20.0 grams of α-cyano-β-phenyl-β-(2-thienyl) acrylamide and 67 grams (=40 mls.) of phosphorus oxychloride. The reaction mixture is heated to 60° C. and stirred until complete solution occurs. Then the stirring is continued for ¾ hr. longer at 60° C. The reaction mixture is cooled to room temperature and drowned into 500 grams of ice-water slush. The slurry is stirred 1½ hrs. at 0–5° C., filtered and washed with 1000 grams of water. The crude product is dried at 80° C. and then stirred with 300 mls. benzene. The slurry is clarified to remove insolubles. The clear benzene extract is evaporated and the residue is recrystallized from 375 mls. isopropanol using animal charcoal. The product is filtered from isopropanol at 5° C. and dried at 80° C. There is obtained 11.9 grams of phenyl-2-thienylmethylene malononitrile. The product has a K max. in methanol=79.4 at 354.

II. Preparation of

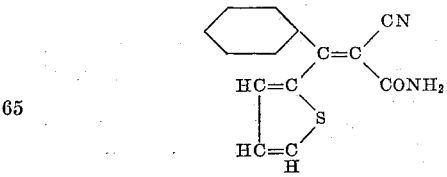

α-cyano-β-phenyl-β-(20-thienyl) acrylamide.

Into a 500 ml. three-necked flask fitted with a stirrer, thermometer, Barrett type water separator (which allows the upper layer to be returned to the reaction flask), reflux condenser and heating mantle are added 47.28 grams of phenyl-2-thienyl ketone (M.W.=189, =0.25 mole), 21.0 grams of cyanoacetamide (M.W.=84, =0.25 mole), 4.0 grams of ammonium acetate, 24 mls. of glacial acetic acid and 50 mls. benzene. The reaction mixture is then heated to vigorous reflux and stirred for 55 hours at 98°–100° C. During this period 1.0 gram additions of ammonium acetate are made after 7 hours, 25 hours and 30 hours. The benzene is then steam distilled from the reaction mixture. The residue after steam distillation is filtered at 35° C. The solid material is washed on the funnel with 200 mls. of water and then ground in a mortar to break up lumps. This material is then heated to 75° C. with 250 mls. isopropanol cooled to 5° C., filtered and washed on the funnel with 100 mls. isopropanol at 5° C. After drying in air at 80° C. there is obtained 44.4 grams of $\alpha$-cyano-$\beta$-phenyl-$\beta$-(2-thienyl) acrylamide which melts at 195.3° C.–197° C.

*Example 2*

Example 1 is repeated except that the ketone employed in the preparation of the intermediate acrylamide is 5-bromo-2-thienyl phenyl ketone.

*Example 3*

Example 2 is repeated employing the following ketones:

(a) 3,4-dimethoxyphenyl-2-furyl ketone
(b) 2,6-dimethyl-3-pyridylphenyl ketone
(c) 4,5-dimethyl-3-pyrrylphenyl ketone
(d) 2,5-dimethyl-3-thienylphenyl ketone
(e) 2-furyl-o-tolyl ketone
(f) 2-methyl-1-naphthyl-2-thienyl ketone
(g) 1-naphthyl-2-pyridyl ketone
(h) Phenyl-3-pyrazolyl ketone
(i) p-hydroxyphenyl-5-methyl-2-thienyl ketone

*Example 4*

The produce of Example 1 is used in a nitrocellulose lacquer as follows:

A mixture of 20 parts of solution I and 80 parts of solution II is prepared wherein solution I consists of:

46 parts ½ sec. nitrocellulose
4 parts product of Example 1
35 parts of Cellolyn 502 (non-drying plasticizing alkyd resin of Hercules Powder Co.)
15 parts dibutyl phthalate and solution II consists of 35 parts butyl acetate
15 parts butanol
50 parts toluene The resulting lacquer solution is drawn out on a metal plate with a Bird film application to give a 3 mil film. A similar film is prepared without the product of Example 1. Upon exposure to ultra-violet light, the latter film yellows and deteriorates before any visible signs of yellowing are observed in the protected film.

*Example 5*

Example 2 is repeated employing as the ketone, p-(2-ethylhexyloxy)-phenyl-2-thienyl ketone.

*Example 6*

The product of Example 5 is incorporated into polyethylene by melting at 125° C. a mixture of 99.7 g. of polyethylene wax P.T. 95504 (Semet-Solvay) and 0.3 g. of absorber. The material is then pressed out in a Carver press to give a film of about 0.03 in. thick. The polyethylene film is well stabilized to ultra-violet light and admirably portects food packaged therein.

*Example 7*

The product of Example 3(c) is incorporated into a synthetic latex as follows:

A 50% dispersion of the absorber of Example 3(c) is made by kneading 20 g. of the compound with 20 g. of formaldehyde-naphthalene-2-sodium sulfonate (Tamol NNO) in a Werner-Pfleiderer mixer for several hours in the presence of sufficient water to keep the material in a viscous state. The material is then evaporated to dryness to give the dispersed form of the absorber. The dispersed absorber is then incorporated into an acrylonitrilebutadiene latex (Chemigum 247) employing 5% of the absorber based on the weight of the latex. The latex is then sprayed onto leather. The film prepared in this manner shows less tendency to yellow on exposure to light than a similar film prepared in the same manner but omitting the ultra-violet absorber.

*Example 8*

The product of Example 3(d) is prepared as a 3% solution in methyl Cellosolve and a sponge of polyvinyl chloride foam is impregnated therewith. The foam is prepared from the following formulation:

|  | Pints |
|---|---|
| Marvinol VR-10 (polyvinyl chloride resin—U.S. Rubber) | 100 |
| Di-2-ethylhexylphthalate | 130 |
| Barium cadmium stabilizer (Advance BS-105) | 3.5 |
| Celogen (p,p'-oxybis)benzenesulfonyl hydrazide | 35 |
|  | 258.5 |

The sponge is squeezed free of solvent and dried. It is much more stable to ultra-violet light than untreated material.

*Example 9*

The product of Example 3(i) is oxyalkylated by adding 5 moles of ethylene to one mole of product containing 1.5% potassium hydroxide while maintaining the mixture in an autoclave at 80° C. The final product contains 5 oxyethyl groups.

*Example 10*

Example 9 is repeated using 10 moles of ethylene oxide. The final product contains 10 oxyethyl groups.

*Example 11*

Example 9 is repeated using 30 moles of ethylene oxide. The final product contains 30 oxyethyl groups.

*Example 12*

Example 9 is repeated using 100 moles of ethylene oxide. The final product contains 100 oxyethyl groups.

*Example 13*

Example 9 is again repeated employing 200 moles of ethylene oxide. The final product contains 200 oxyethyl groups.

*Example 14*

The final product of Example 10 is further reacted with 5 moles of propylene oxide to yield a product having 5 terminal oxypropyl groups.

*Example 15*

The product of Example 10 is dispersed in water (2 g./100 g. water) and is used to treat paper, cotton, and gelled regenerated cellulose. Excellent protection against ultra-violet light degradation is obtained.

*Example 16*

The product of Example 11 is employed in formulating liquid detergent as follows:

|  | Parts |
|---|---|
| Tetrapotassium pyrophosphate | 25 |
| Nonyl phenol + 10 ethylene oxide condensate | 10 |
| Product of Example 11 | 2 |
| Sodium silicate | 3 |
| Carboxy methyl cellulose (low vis.) | 0.5 |
| KOH | 2 |
| Water | 57.5 |

The final formulation shows no degradation when exposed to ultra-violet light for 100 hours.

*Example 17*

2 g. of the product of Example 2 is mixed with 100 g. of granular high molecular weight formaldehyde polymer (Delrin). Excellent stabilization of the polymer is obtained.

*Example 18*

Example 1 is repeated employing as the ketone bis(2-thienyl) ketone.

*Example 19*

Example 1 is again repeated employing the following ketones:
(a) 3-thienyl ketone (bis-[3-thienyl] ketone)
(b) 2-furyl ketone
(c) Bis(5-methyl-2-thienyl) ketone
(d) Bis(5-chloro-2-thienyl) ketone
(e) 5-methyl-2-thienyl-5-bromo-2-thienyl ketone
(f) 2,5-dimethyl-3-thienyl-2-thienyl ketone
(g) 2-furyl-2-thienyl ketone
(h) 2-pyrryl-2-thienyl ketone
(i) 3-indolyl-2-pyridyl ketone
(j) 5-chloro-2-thienyl-3-furyl ketone

*Example 20*

Example 4 is repeated using the compounds of Examples 18 and 19.

*Example 21*

One mole of the reaction product of 5-sulfamyl-2-thienyl-2-thienyl ketone in the Example 1 procedure to produce the malononitrile is oxyalkylated by reaction with 6 moles of ethylene oxide in the presence of 1.2% KOH at 85° C. in an autoclave. The product has the formula:

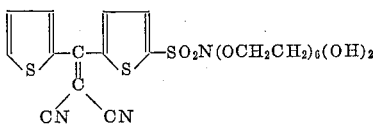

*Example 22*

The procedure of Example 21 is repeated using 15 moles of ethylene oxide. The final product contains 15 oxyethyl groups and 2 terminal hydroxy groups.

*Example 23*

The product of Example 22 is employed in formulating a liquid detergent as follows:

| | Parts |
|---|---|
| Tetrapotassium pyrophosphate | 25 |
| Nonyl phenol + 10 ethylene oxide condensate | 10 |
| Product of Example 22 | 2 |
| Sodium silicate | 3 |
| Carboxy methyl cellulose (low vis.) | 0.5 |
| KOH | 2 |
| Water | 57.5 |

The final formulation shows no degradation when exposed to ultra-violet light for 100 hours.

*Example 24*

The following compounds at a 2% concentration are added to a cosmetic formulation comprising:

| | Parts |
|---|---|
| Petrolatum | 10 |
| Mineral oil | 5 |
| Water | 60 |
| Glyceryl monostearate | 7 |
| Beeswax | 3 |
| Polyvinyl pyrrolidone (K=30) | 1 |

(a) β-(4-sulfophenyl)-β-thienyl methylene malononitrile
(b) β-(4-carboxyphenyl)-β-thienyl methylene malononitrile
(c) Phenyl-2-thienyl-methylene malononitrile
(d) Product of Example 10

The compositions are well stabilized against ultraviolet degradation as well as affording protection to the skin against ultraviolet light when applied thereto.

The compounds employed in this invention are in general soluble in a great variety of solvents, plastics, resins, waxes and the like and, therefore, are particularly adaptable for the stabilization of a great variety of different types of organic materials. The non-oxyalkylated products are insoluble in water. Those compounds which contain smaller amounts of oxyalkyl groups, that is, up to about 4 to 6 groups per molecule, are in general soluble in the more polar organic solvents and fairly readily dispersible in water. The compounds containing larger amounts of alkylene oxide, that is, above about 6 moles per mole of reactive hydrogen containing compound, range from soluble to extremely soluble in water, the solubility increasing as the number of oxyalkyl groups are increased.

The amount of stabilizer to be incorporated is not particularly critical except that sufficient should be present to effect the desired degree of stabilization, and no more should be employed than is necessary to obtain this result. In general, between 0.1% and 10% based on the solids content of the organic material may be used, and preferably between about 0.5% to about 2%. As exemplified above, the ultra-violet absorbers employed with this invention can be used not only to stabilize clear films, plastics and the like, but they may be employed in opaque, semi-opaque or translucent materials, the surface of which is susceptible to degradation by ultra-violet light. Among each different types of materials, most of which have been exemplified, are foamed plastics, opaque films and coatings, opaque papers, translucent and opaque fibers, transparent and opaque colored plastics, fluorescent pigments, polishes, creams, lotions and the like whether opaque, clear, or translucent. The compounds employed in this invention give outstanding protection to paint, enamel and varnish films against fading of pigments and dues contained therein.

The compounds used in the present invention have also been found to be admirably suited for incorporation into the transparent or translucent backings of the various pressure sensitive type adhesive tapes presently in common use. By the employment of these compounds in such a manner, the adhesive nature of the pressure sensitive adhesive is remarkably preserved. Not only may the compounds be incorporated directly into the backing, but they may be used as an overcoating in a transparent or translucent film coating base employing as the film former, any suitable material which will adhere to the tape back. Thus in the case of a regenerated cellulose tape, one may coat the back thereof with one of the cellulosic lacquers hereinbefore described in Example 4.

Other variations in and modifications of the described processes which will be obvious to those skilled in the art can be made in this invention without departing from the scope or spirit thereof.

We claim:
1. An ultraviolet light absorbing composition comprising an organic material susceptible to ultraviolet radiation degradtion and as an absorber for ultraviolet radiation, an amount sufficient to prevent degradation of an essentially colorless compound devoid of nitro groups and having the formula:

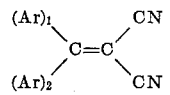

wherein (Ar)₁ is selected from the group consisting of aromatic carbocyclic nuclei and heterocyclic nuclei, (Ar)₂ is a heterocyclic nucleus said heterocylic nuclei containing at least one pair of conjugated double bonds.

2. An ultraviolet light absorbing composition comprising an organic material susceptible to ultraviolet radiation degradation and as an absorber for ultraviolet radiation, from about 0.1% to about 10% by weight based on the weight of said organic material of an essentially colorless compound devoid of nitro groups and having the formula:

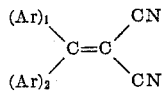

wherein $(Ar)_1$ is selected from the group consisting of aromatic carbocyclic nuclei and heterocyclic nuclei, $(Ar)_2$ is a heterocyclic nucleus said heterocylic nuclei containing at least one pair of conjugated double bonds.

3. An ultraviolet light stabilized film forming organic composition containing dispersed therein an amount sufficient to stabilize said organic composition, an essentially colorless compound devoid of nitro groups and having the formula:

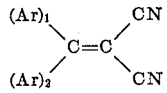

wherein $(Ar)_1$ is selected from the group consisting of aromatic carbocyclic nuclei and heterocyclic nuclei, $(Ar)_2$ is a heterocyclic nucleus said heteroyclic nuclei containing at least one pair of conjugated double bonds.

4. An ultraviolet light stabilized film forming organic composition containing dispersed therein from about 0.1% to about 10% by weight based on the weight of said organic composition, an essentially colorless compound devoid of nitro groups and having the formula:

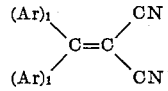

wherein $(Ar)_1$ is selected from the group consisting of aromatic carbocyclic nuclei and heterocyclic nuclei, $(Ar)_2$ is a heterocyclic nucleus said heteroyclic nuclei containing at least one pair of conjugated double bonds.

5. A composition as defined in claim 1 wherein $(Ar)_1$ is phenyl and $(Ar)_2$ is thienyl.

6. A composition as defined in claim 1 wherein $(Ar)_1$ is phenyl and $(Ar)_2$ is furyl.

7. A composition as defined in claim 1 wherein $(Ar)_1$ is phenyl and $(Ar)_2$ is pyrryl.

8. A composition as defined in claim 1 wherein $(Ar)_1$ is phenyl and $(Ar)_2$ is pyrazolyl.

9. A composition as defined in claim 1 wherein $(Ar)_1$ is naphthyl and $(Ar)_2$ is thienyl.

10. A composition as defined in claim 1 wherein $(Ar)_1$ is naphthyl and $(Ar)_2$ is pyridyl.

11. A composition as defined in claim 1 wherein $(Ar)_1$ and $(Ar)_2$ are thienyl.

12. A composition as defined in claim 1 wherein $(Ar)_1$ and $(Ar)_2$ are furyl.

13. A composition as defined in claim 1 wherein $(Ar)_1$ is furyl and $(Ar)_2$ is thienyl.

14. A composition as defined in claim 1 wherein $(Ar)_1$ is pyrryl and $(Ar)_2$ is thienyl.

15. A composition as defined in claim 1 wherein $(Ar)_1$ is indolyl and $(Ar)_2$ is pyridyl.

16. A composition as defined in claim 3 wherein said film forming composition includes nitrocellulose.

17. A composition as defined in claim 3 wherein said film forming composition includes polyethylene.

18. A composition as defined in claim 4 wherein the film forming composition includes nitrocellulose and the stabilizer is phenyl-2-thienyl methylene malononitrile.

19. A composition as defined in claim 4 wherein the film forming composition includes polyethylene and the stabilizer is p-(2-ethylhexyloxy)-phenyl-2-thienyl methylene malononitrile.

References Cited by the Examiner

UNITED STATES PATENTS 3,111,417   11/63   Strobel et al. _____ 260—45.9

LEON J. BERCOVITZ, *Primary Examiner.*